(12) United States Patent
Aleshin (10) Patent No.: US 6,723,953 B2
(45) Date of Patent: Apr. 20, 2004

(54) LASER BEAM STOP SENSOR FOR AUTOMATICALLY DETECTING THE PRESENCE OF LASER BEAM STOP MATERIAL

(75) Inventor: Stephen Aleshin, Muskegon, MI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/255,992

(22) Filed: Sep. 26, 2002

(65) Prior Publication Data

US 2003/0024914 A1 Feb. 6, 2003

Related U.S. Application Data

(62) Division of application No. 09/740,208, filed on Dec. 18, 2000, now Pat. No. 6,476,352.

(51) Int. Cl.[7] ............................................... B23K 26/03
(52) U.S. Cl. ................................................. 219/121.83
(58) Field of Search ....................... 219/121.83, 121.84, 219/121.85, 121.7, 121.71, 121.62, 121.63, 121.64, 121.65, 121.66, 121.67, 121.68; 29/889, 889.2, 889.21, 889.23; 700/166

(56) References Cited

U.S. PATENT DOCUMENTS

| | | | |
|---|---|---|---|
| 5,026,964 A | 6/1991 | Somers et al. | |
| 5,948,293 A | 9/1999 | Somers et al. | |
| 6,054,673 A | * 4/2000 | Chen | 219/121.71 |
| 6,172,327 B1 | 1/2001 | Aleshin et al. | |
| 6,326,585 B1 | 12/2001 | Aleshin et al. | |
| 6,405,435 B1 | * 6/2002 | Konter et al. | 29/889.7 |

* cited by examiner

*Primary Examiner*—M. Alexandra Elve
*Assistant Examiner*—Jonathan Johnson
(74) *Attorney, Agent, or Firm*—Carmen Santa Maria; McNees Wallace & Nurick LLC (57) ABSTRACT

A method for safeguarding regions of an airfoil adjacent to a work area from collateral damage as a result of laser operations. The method utilizes apparatus that includes a sensor assembly. The sensor assembly is fixedly attached to the laser nozzle assembly and moves with the laser nozzle assembly. The laser operations are controlled by a preprogrammed CNC controller. A fixture is used to position the workpiece in relationship to the nozzle on a laser table, the table movable in response to instructions from the controller. A beam stop material is placed over the regions of the airfoil adjacent to the work area to prevent back wall burn or to absorb reflected laser beam energy and to protect the region from other collateral damage such as stray material. The beam stop material is held in place on the workpiece and the workpiece is held in position on the fixture by elastomeric bands. On activation of the CNC program to perform the sequence of operations to accomplish preselected tasks, the laser nozzle performs as one of the operations in the sequence of operations an initial movement. The initial movement of the laser nozzle also causes movement of the sensor assembly. The sensor assembly detects the presence or absence of the elastomeric straps during the initial movement. If the elastomeric straps are detected, a signal is generated and sent to the controller, which then executes the remaining operations in the sequence of operations. If no signal is received by the controller, then the controller does not permit the sequence of operations to continue.

8 Claims, 4 Drawing Sheets

FIG. 4 ately to the work area. Some material being removed from or added to the article can be ejected from the work area and deposited on an adjacent area. Additionally, the laser beam may be reflected onto the adjacent area and may cause damage to the adjacent region. The laser nozzle itself may overshoot its target area or be misaligned, and the adjacent region may be damaged. The laser beam can also cause damage to portions of the workpiece beneath, on the underside or on the opposite side of the work area The most effective method, particularly for airfoil applications, has been for the laser operator to position laser beam stop material onto the airfoil on the regions adjacent to the area that is to be processed. However, due to the fast pace of the manufacturing environment, it is not uncommon after the application of the laser beam stop material that the material is either forgotten during the processing, or is moved out of position inadvertently during the processing. While the failure to place the laser beam stop material into position may not always be catastrophic, that is resulting in the need to scrap the article, it can result in damage that, while repairable, is expensive and time-consuming, usually requiring delicate hand-working operations.

Therefore, what is needed is an effective and reliable method that can prevent operator error by assuring that the laser beam stop material is in position to prevent collateral damage to areas adjacent to that undergoing repair. This method can best be accomplished by modifications to the laser machine and process.

SUMMARY OF THE INVENTION

A method for protecting or safeguarding from collateral damage portions of a workpiece adjacent to the area undergoing laser operations is set forth. The collateral damage is attributable to the effects of laser processing, and can be the result of laser beam reflection onto the adjacent area, back wall burn as a result of the laser beam penetrating the work area and projecting onto an underlying surface of the workpiece, or can be the result of molten material ejected from the region undergoing the laser operation. It can simply be the result of improper functioning of the machine causing it to deviate from its intended path, or from improper positioning of the fixture holding the workpiece in relation to the laser nozzle or improper location of the workpiece in the fixture.

A laser machine that includes a laser nozzle assembly is provided to accomplish the laser operations. The laser operations can include laser welding operations or laser machining operations, such as controlled drilling of laser holes. The laser machine includes a programmable controller that controls the operations of the laser machine and laser nozzle. The controller controls the operation of the machine by sending and receiving signals to initiate and terminate tasks. These tasks are included in a program that is programmed into the controller by an operator. The laser machine also includes a table having a motion system that moves in response to instructions from the controller. The program directs the laser machine, including the movable table, and the laser nozzle assembly to perform a sequence of operations to execute preselected tasks at predetermined locations on the workpiece to accomplish a desired result, such as depositing material to a predetermined thickness or drilling a hole of specified dimensions at a specified location.

The workpiece is typically provided in a fixture. The fixture is used to position the workpiece in spatial relation to the laser nozzle on the laser table. Each operation that is to be performed on the workpiece may require a different fixture, as the spatial relationship may change. As the workpiece is placed into position in the fixture and the fixture is placed into position on the table relative to the laser nozzle but before the laser beam is activated, a beam stop material is placed over the workpiece to shield regions adjacent to the areas which are to undergo the laser operations, thereby affording these regions protection from the various undesirable collateral effects that can result from a laser operation, as previously set forth.

In the present invention, a sensor is provided to sense the presence or absence of beam stop material. The sensor is attached to the laser nozzle so that the sensor has a fixed spatial relationship with respect to the nozzle. Furthermore, the sensor is attached so that it will move as the laser nozzle moves. The program that directs the laser machine and the laser nozzle assembly to perform the sequence of operations is then executed. One of the operations in the sequence of operations programmed into the controller directs the laser nozzle to move to a preselected position. Upon moving the laser nozzle to a preselected position, the sensor, which also moves with the nozzle, detects the presence or absence of the beam stop material at the preselected locations of the workpiece adjacent to the location or locations at which operations are to be performed. If the beam stop material is present at the preselected location or locations, a signal is generated by the sensor and sent to the controller. At this point, the program is in a decision mode. In response to a signal from the sensor indicating the presence of the beam stop material in the appropriate location, the program provides instructions to the controller to execute the required sequence of operations. If a signal is not received from the sensor, the program remains in a holding pattern awaiting a positive response from the sensor. If no signal is received, the program does not provide the instructions required to execute the required sequence of operations.

An advantage of the present invention is that the reliance on the laser operator is no longer required to assure the proper placement of the beam stop material prior to initiation of the work operation.

Another advantage of the present invention is that the failure of the laser operator to properly place the beam stop material into position over the regions adjacent to the work area or the failure of the laser operator or properly position the beam stop at the correct location will prevent the laser operations from proceeding. The fail-safe nature of the process will also allow, indeed require, the laser operator to properly locate the beam material in position before the laser operations can proceed.

Still another advantage of the present invention is that collateral damage to regions adjacent to the work area will be prevented. As a result, time consuming and expensive hand rework operations will be reduced or eliminated, and scrap rates of expensive parts such as airfoils will be reduced.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Whenever possible, the same reference numbers will be used throughout the figures to refer to the same parts.

DETAILED DESCRIPTION OF THE PREFERRED EMBODIMENTS

The present invention is directed to a method for preventing a laser machine from performing operations on a workpiece unless a suitable beam stop material is in place in areas adjacent to the locations at which the preselected operations are to be performed. The method finds particular use in turbine airfoil manufacturing, in which the expensive workpiece is in the form of a turbine airfoil. The method and the apparatus of the present invention improve upon the current methods of protecting areas adjacent to the locations where laser operations are performed. Currently, protection of these areas is dependent upon operator diligence for proper placement and location of the beam stop material.

Beam stop material can be any suitable material that can be used to absorb sufficient energy from the laser beam so as to render the laser beam ineffective as an energy source capable of performing an operation on a workpiece. As the laser beam is directed onto a workpiece, the laser beam strikes the workpiece to accomplish a specific work operation. This work operation may be a welding operation or a metal removal operation, such as a hole drilling operation or a trimming operation. However, during welding operations, a laser beam or a portion of a laser beam can reflect from the surface of the workpiece onto an adjacent area next to the area undergoing the operation with sufficient energy to cause collateral damage to the adjacent area. While these reflections can also occur during metal removal operations, a more prevalent problem is back wall burn, previously discussed. Beam stop materials are well known in the art, and are used in the adjacent areas subject to collateral damage to absorb laser energy. Different beam stop materials are used for different types of laser beams. Beam stop materials may also vary from one workpiece to the another, as more energy may be required to remove sufficient energy from a laser beam, or reflections of a laser beam, to prevent damage to a workpiece made of one type of material than from a workpiece made of a different type of material. While the primary purpose of the beam stop material is to prevent back wall strikes and to absorb reflections from the laser beam, or at least sufficient amounts of energy so as to render the reflected beam ineffective, the beam stop material provides the added advantage of protecting the surfaces adjacent to the preselected locations at which preselected operations are to be performed from molten material spattered or ejected from the location undergoing the laser operations. Beam stop materials may be held in place by the workpiece, or may be made in such a manner so as to be assembled to the workpiece and be held in place on the workpiece. However, the diligence of the operator in placing and removing the beam stop material is still required.

Figure 1:
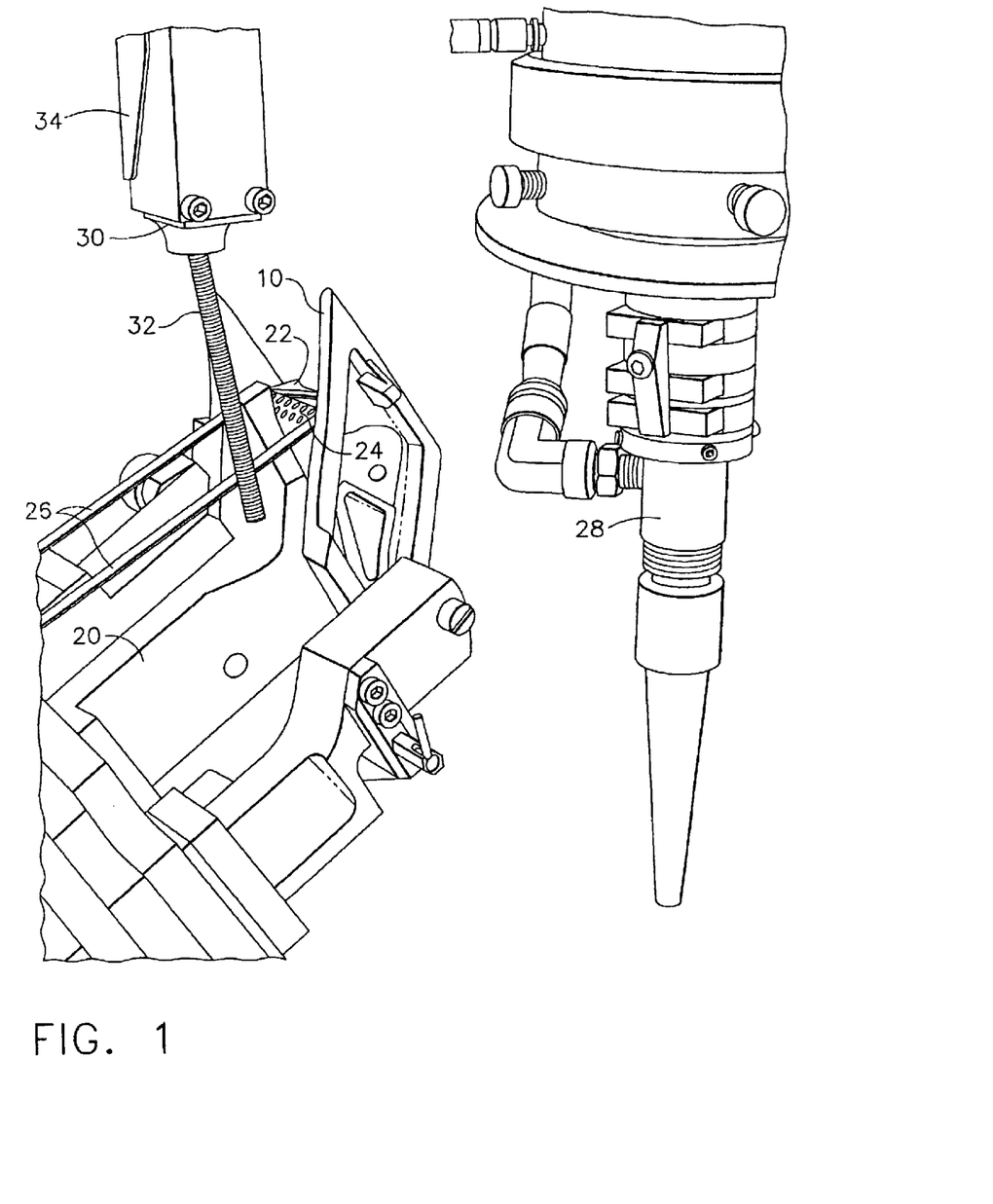
FIG. 1 is a front elevation view of the present invention, showing the spatial relationship among the laser nozzle, the workpiece, the fixture, the beam stop material and the sensor of the present invention, with the sensor engaged.
Figure 2:
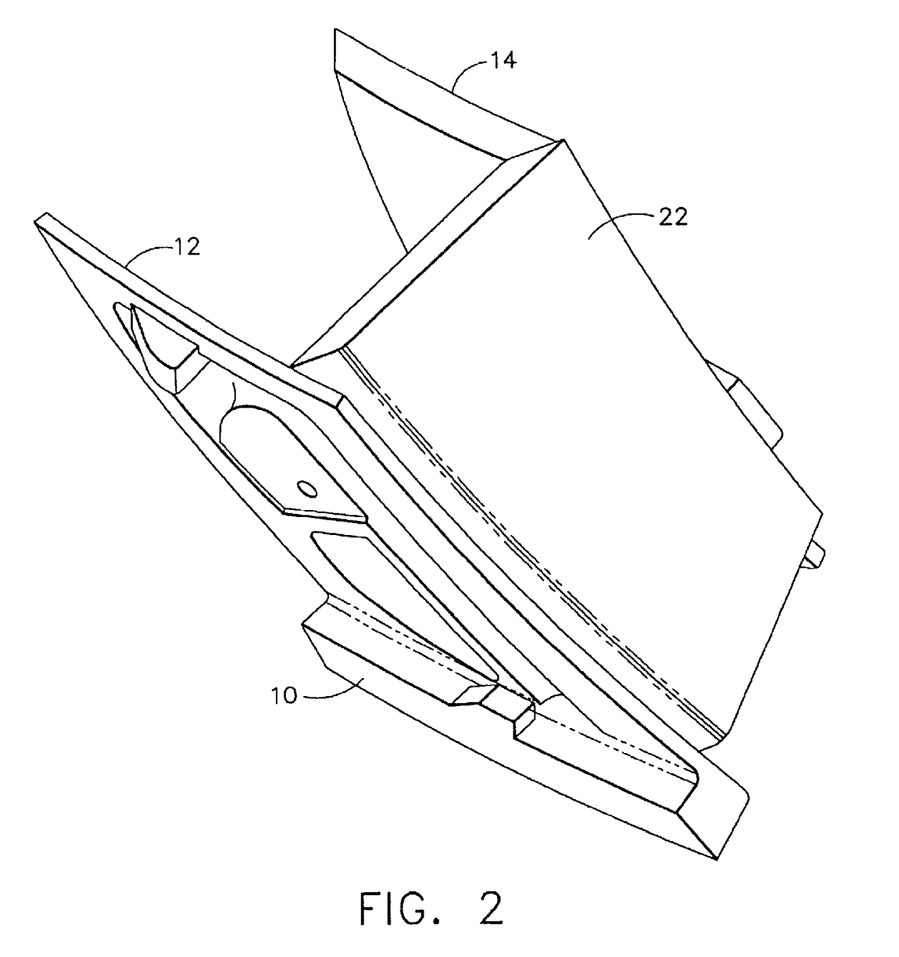
FIG. 2 is top view of the beam stop material in position adjacent to predetermined work areas of a workpiece, but not located in the fixture.

Referring now to FIG. 1, which is a preferred embodiment of the present invention, shows an apparatus for practicing the method of the present invention. A turbine airfoil 10, such as a turbine vane, was assembled into a fixture 20. Referring now to FIG. 2, outer band 12 and inner band 14 of turbine airfoil 10 include the preselected locations that are to undergo a laser operation, in this example, laser drilling of apertures through outer 12 and inner band 14. After turbine airfoil 10 was fixedly engaged in fixture 20, beam stop material 22 was placed over airfoil surface 10 (not shown) between outer band 12 and inner band 14 to protect the airfoil surface from back wall burn. The placement of the beam stop material 22 is depicted in FIG. 2. Fixture 20 having turbine airfoil 10 fixedly engaged was then moved into position adjacent to laser nozzle 28. At some point in time prior to initiation of the laser operation, beam stop material is secured in place on the workpiece with straps 26, which preferably are made from elastomeric material. Laser nozzle 28 is a standard laser nozzle well known in the art. The head of nozzle 28 is suspended from a movable arm (not shown) which moves to position nozzle 28 in accordance with instructions from a programmable controller (not shown). Typically, the laser head is first moved by the controller to a start position or home position prior to beginning an operation so that the exact location of the head and nozzle is known. The programmable controller controls the sequence of operations that include not only movement of the head of the nozzle along several possible axes of movement, but also the indexing of the workpiece under the nozzle, the application of power to the laser, the application of gases to the laser nozzle, in short, all aspects of the task to be accomplished. Also attached to the movable arm is a sensor assembly 30. Sensor assembly 30 is comprised of a wobble stick 32 that is assembled to switch 34. Switch 34 is responsive to the positioning of wobble stick 32, and switch 34 can communicate with the programmable controller. Because sensor assembly 30 is attached to the same movable arm as the head of nozzle 28, it moves in the same manner as nozzle 28.

Figure 3:
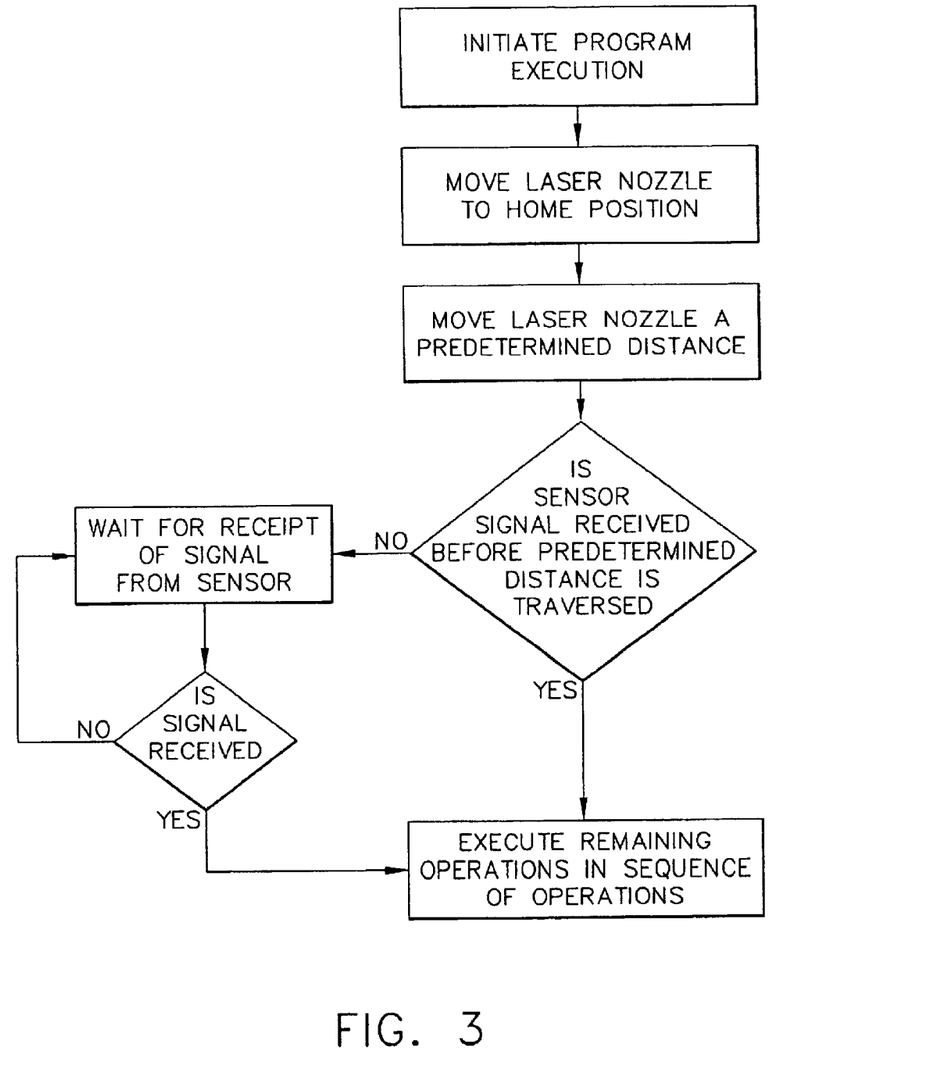
FIG. 3 is a flow chart representing a first decision mode of the controller for determining the presence or absence of beam stop material.

As shown in FIG. 1, sensor assembly 30 was initially positioned in a vertical direction sufficiently above fixture 20 so as not to contact fixture 20, but sufficiently low enough so that wobble stick 32 can contact elastomeric straps 26. In initial operation, sensor assembly 30 was positioned out of contact with elastomeric straps 26. On activating the laser machine to perform the sequence of operations to accomplish preselected tasks, in this case, a laser drilling operation, the programmable controller directs the movable arm to move a predetermined distance in the direction of elastomeric straps 26. If elastomeric straps 26 are properly installed, wobble stick 32 contacts elastomeric straps 26, which acts upon switch 34, causing switch 34 to close. Wobble stick 32 in contact with elastomeric straps 26 was the case shown in FIG. 1. Upon closing of switch 34, sensor assembly 30 generated a signal that was transmitted to the programmable controller. Upon receiving the signal from sensor assembly 30, the programmable controller then proceeded with the execution of the program that provided detailed instructions to the laser machine to perform the remaining operations in the sequence of operations to accomplish the tasks of drilling apertures in outer band 12 or inner band 14 of turbine airfoil 10. This is depicted in the abbreviated flow chart of FIG. 3.

Figure 4:
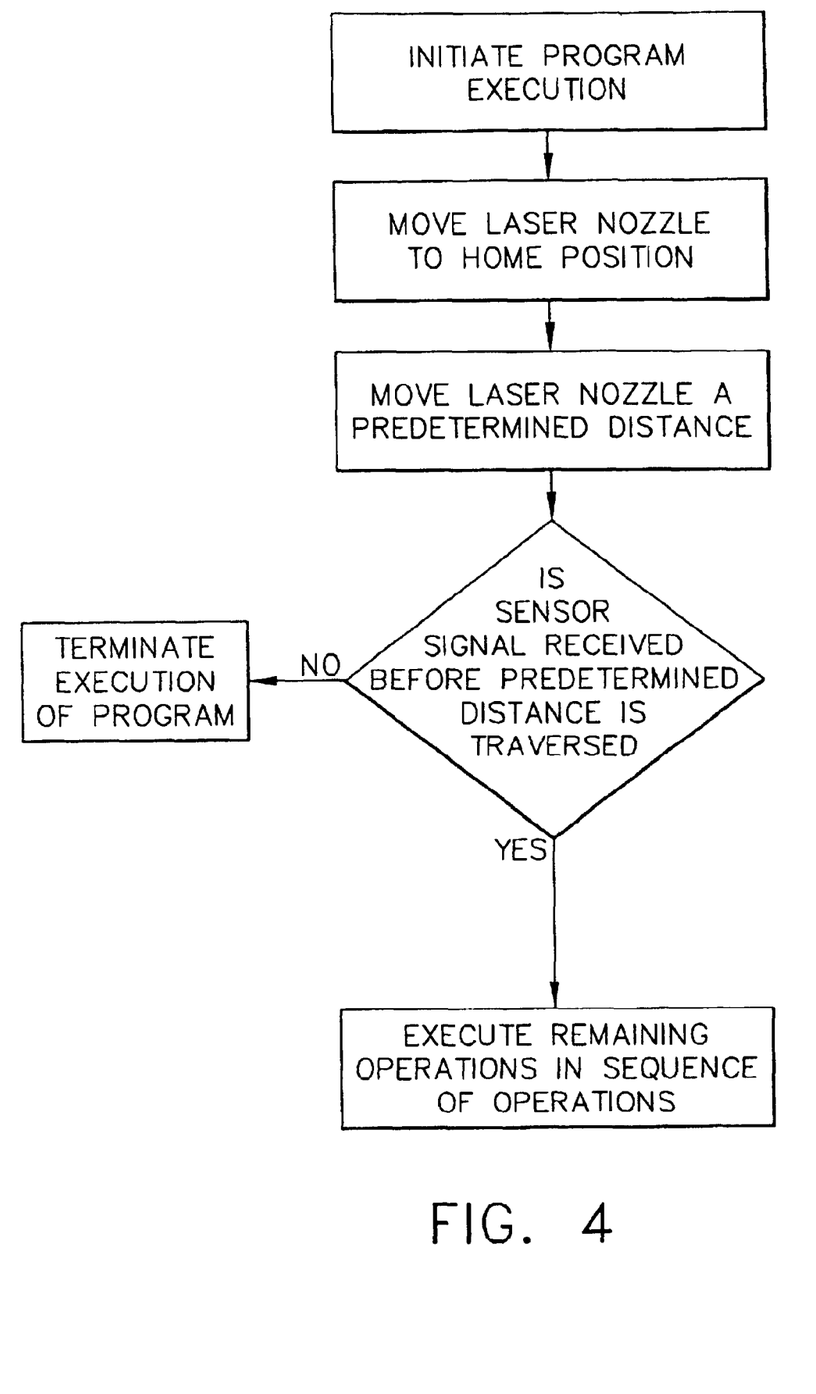
FIG. 4 is a flow chart representing a second decision mode of the controller for determining the presence or absence of beam stop material.

Although FIG. 1 depicts wobble stick 32 in contact with elastomeric straps 26, it will be understood that upon activating the laser machine to perform the sequence of operations to accomplish preselected tasks, in this case, a laser drilling operation, the programmable controller directs the movable arm to move a predetermined distance in the direction of elastomeric straps 26. If elastomeric straps 26 are not properly installed, or are not installed at all, wobble stick 32 does not contact straps 26, and switch 34 is not closed. If, by the time the movable arm has moved the predetermined distance, no signal is received by the programmable controller, the programmable controller does not issue further instructions for performing the laser drilling operations. This can be accomplished in any one of several ways. For example, the controller can wait for receipt of a signal from the sensor assembly 30 before providing instructions for the next operations in the sequence of operations. Alternatively, the controller can issue an instruction that shuts the operation down, requiring the operator to restart the operation. This shutdown sequence is depicted in the abbreviated flow chart of FIG. 4. In either of these situations, or in any other similar arrangement, the operator is alerted that there is a problem with the set-up that must be corrected before the operations can continue. He can be alerted simply by being aware that the operation has ceased, or by a visual or audible alarm that is generated. The assembly set forth in FIG. 1 operates under an assumption that the operator properly installs the beam stop material in place on the workpiece before assembling the straps into position.

While the preferred embodiment described above is the best mode currently used to practice the invention, it will be understood by those skilled in the art that there are many variations to the best mode that can provide an assembly that can accomplish the above described method. While the above described embodiment utilizes a programmable computer numeric controller (CNC), it will be understood that any digital control means that can be adapted to control the laser machine may be used. For example, a digital computer can be used. The controller used does not place a limitation on the method of the present invention, as long as the controller can respond to a signal generated upon sensing that beam stop material is properly in place to protect regions of the workpiece, a turbine airfoil in the preferred embodiment, from collateral damage that can result from the laser operations. Although the signal generated in the preferred embodiment was an electrical impulse, the signal is not so restricted. The signal may be a digital signal, or it may be an infrared signal or an ultrasonic signal or any other type of signal. The controller is arranged to respond to the type of signal generated by sensor assembly 30.

The best mode of practicing the invention utilizes elastomeric straps such as neoprene or polyester straps. However, any elastomeric material may be used for the straps. The elastomeric straps provide a quick, easy method for locking the insert in place on the workpiece and for locking the part in place on the fixture. In addition, the elastomeric straps can be used for a variety of parts of different configuration without requiring special custom manufacturing to mate up with the variety of parts. The straps also provide an easy go/no-go means of determining the presence or absence of the beam stop material, assuming that the operator has assembled the beam stop material in position when attaching the straps. However, the straps are not limited to elastomeric materials. Any material that can hold the workpiece in position against the fixture may be utilized. Thus a nylon strap with a tightening clip may be used, or metallic straps may be used. Alternatively, a metallic clamping arrangement that fixes beam stop material 22 in position on a workpiece such as turbine airfoil 10 may also be used. This clamping arrangement can include clamps, fastening devices, locking pieces or fingers that secure the beam stop material in position against the workpiece or article. However, such custom alternate designs are more expensive than the simple elastomeric straps. Sensor assembly 30 can be aligned to detect the presence or absence of any of these devices for securing beam stop material 22 in position.

In another embodiment, sensor assembly 30 is arranged over turbine airfoil 10 in a manner so that wobble stick 32 is moved into contact with beam stop material 22. If, upon activation of the program by the controller, beam stop material is not contacted by wobble stick 32 within a predetermined distance, then no signal is generated by sensor assembly 30 and the operations terminate as previously described. In this embodiment, sensor assembly 30 is determining the presence or absence of beam stop material 22 rather than elastomeric straps 26 which fix turbine airfoil 10 in position on fixture 20.

In another embodiment, the sensor assembly 30 can be a signal generator that is used to determine the distance from the sensor 30 to beam stop material 22. If the proper distance is not measured by the sensor assembly 30, then an instruction is sent to the controller indicating that the proper distance has not been detected and the operations are halted until the proper distance is detected. The signal generator that can be used can be an ultrasonic generator, an infrared generator or even a low power laser typically used to accurately measure distances. The type of sensor assembly 30 is not a limitation on the method of the present invention. As indicated above, it can be an inexpensive mechanical switching assembly that generates an electrical signal that can be transmitted to the controller, or it can be an expensive assembly that determines the presence or absence of the beam stop material 22, providing the controller with detailed information, if desired.

The present invention also contemplates the use of sensor assembly 30 as part of the manufacturing operation to notify the operator to remove the beam stop material 22 when required, if he has not already done so. As an example, with reference to the preferred embodiment as set forth above, after the selected laser apertures have been drilled in the outer band 12 and the inner band 14, the next set of operations may require, for purposes of illustration, laser machining a feature into turbine airfoil 10 in an area adjacent to outer band 12 and inner band 14. Since this area is covered with beam stop material 22, the laser nozzle 28 will not be able to accomplish this task unless beam stop material 22 is removed. Typically, the operator currently is responsible for accomplishing this task, which may or may not be done. The present invention can assure that the task is accomplished. Here, the programmable controller is programmed with preliminary instructions to determine the presence or absence of beam stop material 22. Prior to executing the next set of operations, which for illustration purposes are laser machining operations adjacent to outer band 12 and inner band 14, the programmable controller issues instructions to move laser nozzle 28 to the home position. After verifying that the laser head and nozzle 28 have been moved to the home position, the controller provides an instruction to move the nozzle a predetermined distance in the direction of fixture 20. The controller can be programmed to direct movement of the laser nozzle 28 in a direction so that sensor assembly 30 can detect the presence of either beam stop material 22 or straps 26, or both. If sensor assembly does not generate a signal or signals indicating the removal of beam strap material 22 or straps 26 within the predetermined distance, then the sequence of operations to accomplish the laser machining will be executed. However, if a signal is generated indicating that beam stop material 22 may be present, sensor assembly 30 will generate a signal or signals for transmission to the programmable controller. Upon receiving the signal from sensor assembly 30 indicative of the possible presence of beam stop material 22, the programmable controller can activate an alert to the operator via a signal or alarm that beam stop material 22 may be in place, requiring the operator to verify the presence of beam stop material 22 and remove it, if necessary. The operator can then issue an override instruction to continue operations. Alternatively, the controller can issue an instruction that shuts the operation down, requiring the operator to restart the operation. The operator must implement corrective actions before the operations are to continue. He can be alerted simply by being aware that the operation has ceased, or by a visual or audible alarm that can be generated.

These sequences can be programmed into the programmable controller as desired to determine the presence or absence of beam stop material 22 as appropriate for any operation or sequence of operations.

Although the present invention has been described in connection with specific examples and embodiments, those skilled in the art will recognize that the present invention is capable of other variations and modifications within its scope. These examples and embodiments are intended as typical of, rather than in any way limiting on, the scope of the present invention as presented in the appended claims.

What is claimed is:

1. Apparatus for safeguarding portions of a turbine airfoil from damage while performing a laser operation on the turbine airfoil with a laser beam, the apparatus comprising:

a laser machine for generating a laser beam that includes a programmable controller and a laser nozzle, the laser beam activated through the laser nozzle in response to an instruction from the controller, the laser nozzle movable in response to a second instruction from the controller, and a table having a motion system that is movable in response to a third instruction from the controller;

a fixture attachable to the laser table for holding the turbine airfoil in position in relation to the laser nozzle, the fixture in communication with the controller and movable in response to a third instruction from the controller, beam stop material assembled to the workpiece for protecting a portion of the workpiece from damage while the laser beam is activated;

means for securing the beam stop material in position with respect to the workpiece to protect the portion of the workpiece from damage;

a sensor, for determining the presence of the beam stop material, the sensor capable of generating and sending a signal to the controller in response to the presence of the material, the sensor having a fixed spatial relationship with the laser nozzle and movable with the laser nozzle, the sensor in communication with the programmable controller, the programmable controller programmed to provide instructions responsive to the signal sent by the sensor.

2. The apparatus of claim 1 wherein the sensor includes a wobble stick and a switch, the wobble stick causing the switch to close on contact with a surface indicative of the presence of beam stop material, thereby causing a signal to be generated.

3. The apparatus of claim 1 wherein the sensor includes a measuring device that measures the distance between the sensor and the workpiece, the sensor transmitting the measured distance to the programmable controller to determine the presence of beam stop material.

4. The apparatus of claim 3 wherein the sensor is a laser-measuring device.

5. The apparatus of claim 3 wherein the sensor is an ultrasonic measuring device.

6. The apparatus of claim 1 wherein the means for securing the beam stop material in position with respect to the workpiece includes elastomeric straps.

7. The apparatus of claim 6 wherein the sensor is capable of sensing the presence of elastomeric straps and generates a signal in response to the presence of the straps.

8. The apparatus of claim 1 wherein the sensor is capable of sensing the presence of the means for securing the beam stop material in position with respect to the workpiece and generates a signal in response to the presence of the straps.

* * * * *

UNITED STATES PATENT AND TRADEMARK OFFICE
CERTIFICATE OF CORRECTION

PATENT NO. : 6,723,953 B2  Page 1 of 1
DATED : April 20, 2004
INVENTOR(S) : Aleshin, Stephen It is certified that error appears in the above-identified patent and that said Letters Patent is hereby corrected as shown below:

Column 8,
Line 38, "controller." should be -- controller; --.

Signed and Sealed this

Twenty-second Day of November, 2005

JON W. DUDAS
*Director of the United States Patent and Trademark Office*